United States Patent
Murray

(10) Patent No.: US 7,563,194 B2
(45) Date of Patent: Jul. 21, 2009

(54) CONTROL METHOD AND CONTROLLER FOR A MOTOR VEHICLE DRIVE TRAIN

(75) Inventor: Stephen William Murray, Grimsargh (GB)

(73) Assignee: Torotak (Development) Limited, Lancashire (GB)

( * ) Notice: Subject to any disclaimer, the term of this patent is extended or adjusted under 35 U.S.C. 154(b) by 531 days.

(21) Appl. No.: 10/564,436

(22) PCT Filed: May 18, 2004

(86) PCT No.: PCT/GB2004/002136

§ 371 (c)(1), (2), (4) Date: Jul. 25, 2006

(87) PCT Pub. No.: WO2005/015058

PCT Pub. Date: Feb. 17, 2005

(65) Prior Publication Data

US 2007/0050118 A1   Mar. 1, 2007

(30) Foreign Application Priority Data

Jul. 12, 2003 (GB) ................................. 0316385.4

(51) Int. Cl.
*B60W 10/00* (2006.01)
(52) U.S. Cl. ......................................................... 477/40
(58) Field of Classification Search .................. 477/40, 477/50

See application file for complete search history.

(56) References Cited

U.S. PATENT DOCUMENTS

| | | | |
|---|---|---|---|
| 5,209,332 A | 5/1993 | Okayasu | |
| 6,418,369 B2 * | 7/2002 | Matsumoto et al. | 701/80 |
| 6,666,793 B2 * | 12/2003 | Narita et al. | 477/40 |
| 6,859,711 B2 * | 2/2005 | Eckert et al. | 701/70 |
| 7,400,964 B2 * | 7/2008 | Shiiba et al. | 701/96 |
| 2007/0191181 A1 * | 8/2007 | Burns | 477/40 |

FOREIGN PATENT DOCUMENTS

| | | |
|---|---|---|
| DE | 100 39 942 A1 | 2/2002 |
| EP | 0 444 086 | 9/1991 |
| EP | 1 156 239 A1 | 11/2001 |
| JP | 11-343888 | 12/1999 |
| JP | 2003-194204 | 7/2003 |
| WO | WO 90/05860 A1 | 5/1990 |

\* cited by examiner

*Primary Examiner*—Dirk Wright
(74) *Attorney, Agent, or Firm*—Blakely, Sokoloff, Taylor & Zafman LLP

(57) ABSTRACT

There is described a controller for motor vehicle drive train comprising an engine and a continuously variable ratio transmission providing geared neutral, the controller serving to set demands for wheel torque and engine speed in dependence upon a driver input, characterised in that the controller is adapted to respond to input from the driver indicative of a requirement for an engine speed increase prior to vehicle launch by raising engine speed while implementing a reduced wheel torque strategy, and to subsequently raise wheel torque following input from the vehicle driver by which launch is initiated.

9 Claims, 4 Drawing Sheets

CONTROL METHOD AND CONTROLLER FOR A MOTOR VEHICLE DRIVE TRAIN

This is a National Phase of International Application No. PCT/GB2004/002136, filed on May 18, 2004, which claims priority from Great Britain Patent Application No. 0316385.4, filed on Jul. 12, 2003.

The present invention is concerned with control of a motor vehicle's engine and transmission prior to and during launch, the transmission in question being of the continuously variable type and providing geared neutral.

While a motor vehicle having an automatic transmission is at rest, the driver typically keeps the brake pedal depressed. To initiate launch (i.e. to move away from rest) the driver steps off the brake pedal and onto the accelerator. Before the engine can reach the speed and output torque required to meet the driver's requirement, as indicated through the accelerator pedal, pressure must be raised in the engine's intake manifold and engine speed must typically be raised from idle speed. The result is a delay prior to delivery of torque at the driven wheels.

In a vehicle having a conventional automatic transmission with a stepped ratio gearbox coupled through a torque converter, it is possible to achieve a faster launch by depressing both brake and accelerator pedals concurrently while the vehicle is stationary. In this condition the engine speed increases toward the torque converter stall speed. Wheel torque increases toward the maximum available. The brakes keep the vehicle stationary until, by releasing them, the driver initiates launch. Upon launch, engine speed and torque are already raised and the delays mentioned above are thus avoided. So-called "left-foot braking" is normally regarded as an abuse condition but it does allow a rapid launch and improve the vehicle's acceleration from rest. It is reliant upon the role of the torque converter which serves both to de-couple the engine from the wheels at rest and to dissipate the energy output by the engine.

The present invention is concerned with a different type of motor vehicle transmission, having a continuously variable ratio device ("variator") and providing geared neutral, which is a condition in which the transmission provides an infinitely low gear ratio so that the engine can remain running and coupled to the driven wheels through the transmission even while the vehicle is stationary. The geared neutral concept is well known in the industry. One way to achieve it is to use an epicyclic shunt of the type having three input/output shafts wherein the speed of one shaft is proportional to a sum of speeds of the other two shafts. One shaft is driven from the engine at fixed gear ratio. Another is driven from the engine through the variator at continuously variable ratio. The shunt's third shaft is coupled to the driven wheels. At a certain variator ratio ("geared neutral ratio"), corresponding to the geared neutral state, the two drive inputs to the shunt cancel each other out leaving the third shaft stationary. In such a transmission power is re-circulated in a loop containing the variator and the shunt. It is not necessary to provide a clutch or torque converter to de-couple the engine and wheels prior to launch.

Variators can be divided into (1) ratio controlled types and (2) torque controlled types. The present invention has been devised in connection with a transmission having a torque controlled variator and is considered particularly suited to this type of transmission, although it is potentially applicable to the ratio controlled type.

A ratio-controlled variator receives a control signal (from an associated electronic controller) representing a required variator drive ratio. The variator responds by adjusting its drive ratio to the required value. The adjustment typically involves detecting the position of a ratio-determining element of the variator (e.g. the separation of the sheaves in a belt-and-sheave variator, or the position of the rollers in a toroidal-race type variator) and adjusting the actual position of this element to a desired position (determined by the control signal) using a feedback loop. Thus in a ratio controlled variator, ratio corresponds directly to the control signal.

This is not the case in a torque-controlled variator. Instead a torque-controlled variator is constructed and arranged such as to exert upon its input and output members torques which, for a given variator drive ratio, correspond directly to the control signal. It is torque which is the control variable rather than drive ratio. Changes in speed of the variator input and output, and hence changes in variator drive ratio, result from the application of these torques, added to externally applied torques (e.g. from engine and wheels), to the inertias coupled to the variator input and output. The variator drive ratio is permitted to change correspondingly.

Torque control has to date principally been applied to toroidal-race, rolling-traction type variators as described for example in Torotrak (Development) Ltd's European patent EP 444086. In this type of variator, rollers serve to transmit drive between co-axially mounted input and output discs. The variator rollers exert respective torques $T_{in}$ and $T_{out}$ upon the input and output discs. Correspondingly the rollers experience a "reaction torque" $T_{in}$ and $T_{out}$ about the disc axis. This reaction torque is opposed by an equal and opposite torque applied to the rollers about the axis by a set of actuators. The geometry is such that movement of the rollers about the disc axis is accompanied by "precession" of the rollers—a change in the angles of the roller axes to the disc axis, effecting a corresponding change in variator drive ratio. By controlling the actuator torque, the reaction torque $T_{in}+T_{out}$ is directly controlled. The control signal in this type of variator corresponds directly to the reaction torque.

The actual torques exerted by the variator upon its input and output depend not only on the control signal but also upon the prevailing drive ratio, since although the sum $T_{in}+T_{out}$ is uniquely determined by the control signal, the ratio $T_{in}/T_{out}$ is equal to the reciprocal of the variator drive ratio, and so subject to change with the variator drive ratio.

The variator can thus be understood to comprise a component—the movable variator roller—whose position corresponds to the prevailing variator drive ratio, this component being subject to biasing which is determined by the control signal and is balanced by the torques created at the variator input/output.

An object of the present invention is to enhance launch performance of a motor vehicle having a continuously variable, geared neutral type transmission.

In accordance with a first aspect of the present invention there is a controller for a motor vehicle drive train comprising an engine and a continuously variable ratio transmission providing geared neutral, the controller serving to set demands for wheel torque and engine speed in dependence upon a driver input, characterised in that the controller is adapted to respond to input from the driver indicative of a requirement for an engine speed increase prior to vehicle launch by raising engine speed while implementing a reduced wheel torque strategy, and to subsequently raise wheel torque following input from the driver by which launch is initiated.

Left foot braking as such is not the only type of control input which could be used. Some hand operated control could instead be provided to the driver.

In accordance with the invention, it is not necessary to create large wheel torques in order to prepare the engine for launch. Application of the brakes while stationary is not essential to all embodiments.

In accordance with a second aspect of the present invention there is a method of controlling a motor vehicle drive train comprising an engine and a continuously variable transmission providing geared neutral, the method comprising setting demands for engine speed and wheel torque in dependence upon a driver input and being characterised in that, in response to a driver input indicative of a requirement for an engine speed increase prior to vehicle launch engine speed is raised while a reduced wheel torque strategy is implemented, wheel torque being subsequently raised following initiation of vehicle launch.

Specific embodiments of the present invention will now be described, by way of example only, with reference to the accompanying drawings in which.

The present invention has been developed in connection with a vehicle transmission using a torque-controlled variator of toroidal-race, rolling-traction type. The invention is considered potentially applicable to other types of transmission. Nonetheless the toroidal-race variator in question will now be very briefly described, in order to illustrate certain relevant principles.

Figure 2:
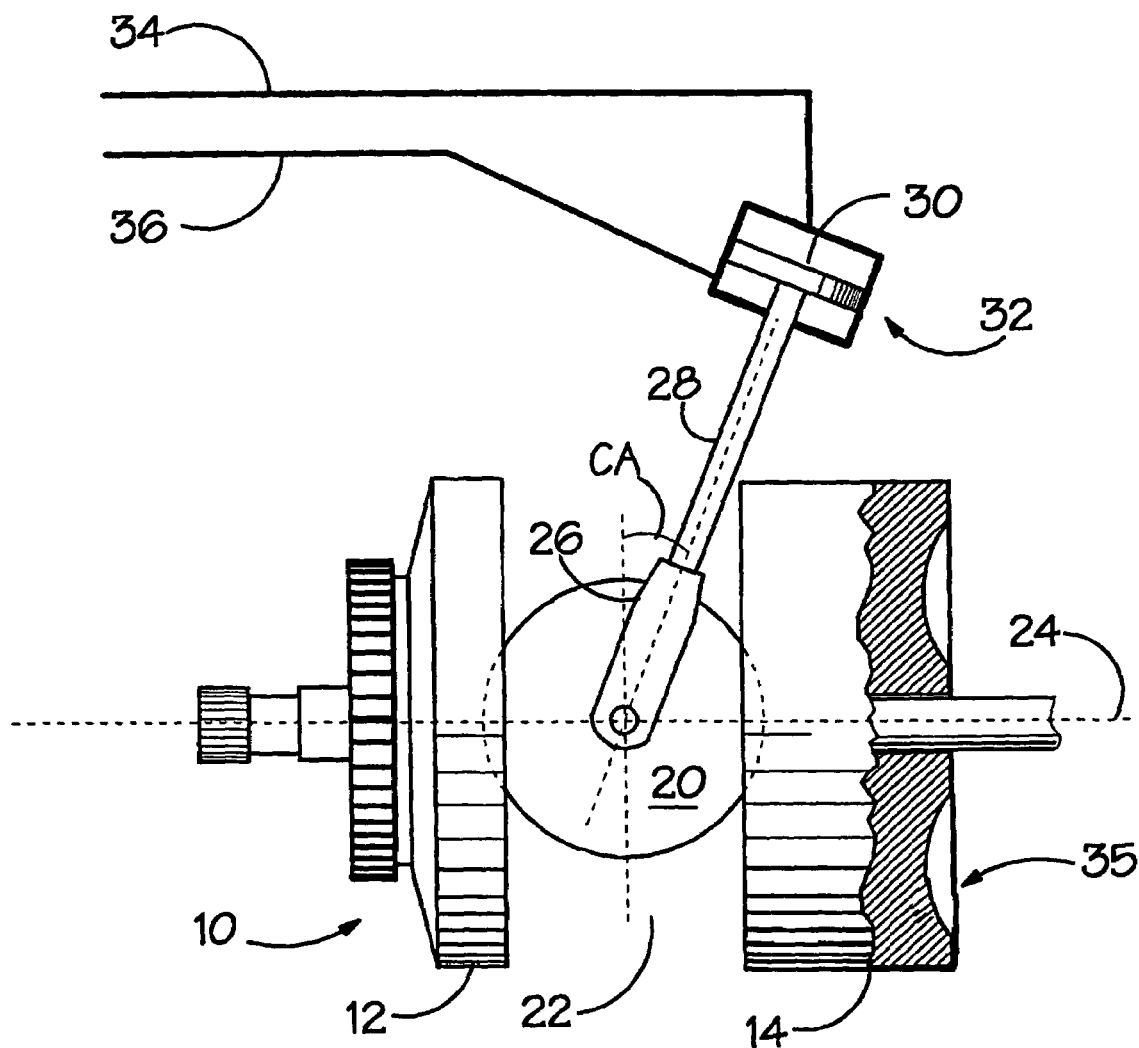
FIG. 2 is a simplified representation of a variator used in the FIG. 1 transmission.

FIG. 2 illustrates some of the major components of the variator 10 which is seen to comprise co-axially mounted input and output discs 12, 14 together defining a toroidal cavity 22 containing a variator roller 20. The roller runs on respective faces of the input and output discs in order to transmit drive from one to the other. The roller is mounted in a manner permitting it to move along a circumferential direction about the axis 24 of the discs 12, 14. The roller is also able to "precess". That is, the roller's axis is able to rotate, changing the inclination of the roller to the disc axis. In the illustrated example the roller is mounted in a carriage 26 coupled by a stem 28 to a piston 30 of an actuator 32. A line from the centre of the piston 30 to the centre of the roller 20 constitutes a "precession axis" about which the whole assembly can rotate. Changes in the inclination of the roller result in changes in the radii of the paths traced on the input and output discs 12, 14 by the roller. Consequently a change in roller inclination is accompanied by a change in variator drive ratio.

Note that the precession axis does not lie precisely in a plane perpendicular to the disc axis, but is instead angled to this plane. This angle, labelled CA in FIG. 2, is referred to herein as the "castor angle". The roller's mounting permits it to move, the centre of the roller following a circular path centred on the disc axis. Furthermore, the action of the discs 12, 14 upon the rollers tends to maintain the rollers at such an inclination that the roller axis intersects the disc axis. This intersection of the axes can be maintained, despite movement of the roller along its circular path, by virtue of the castor angle. The result is that translational movement of the roller about the disc axis is accompanied by precession of the roller and so by a change in variator drive ratio. If one neglects slip between the roller and the discs, the position of the variator roller corresponds to the variator drive ratio and so to the speed ratio between the engine and the driven wheels.

The actuator 32 receives opposed hydraulic fluid pressures through lines 34, 36 and force applied to the roller by the actuator to the roller corresponds to the difference in pressures in the lines. This pressure difference is the principal control signal applied to the variator, in this example. The effect of this force is to urge the roller to move along its circular path about the disc axis. Equivalently one can say that the actuator exerts a torque about the disc axis upon the roller. The actuator torque is balanced by torque created by the interaction of the roller with the discs. The roller exerts a torque $T_{in}$ upon the input disc 12 and a torque $T_{out}$ upon the output disc 14. Correspondingly the discs together exert a torque $T_{in}+T_{out}$ upon the roller, about the disc axis. The quantity $T_{in}+T_{out}$ (the reaction torque) is at all times equal to the actuator torque and so directly proportional to the control signal formed by the aforementioned pressure difference.

The illustrated variator 10 is of course greatly simplified for the sake of clarity. For instance a practical variator typically has two pairs of input/output discs defining two toroidal cavities each of which contains a set of rollers. The drawing shows in section a face 35 of output disc 14 with part toroidal cutaways to form the second cavity. In such an arrangement the reaction torque is the sum of the torques applied to all of the variator rollers. The principles of operation set out above are however essentially unchanged in a practical transmission.

Figure 1:
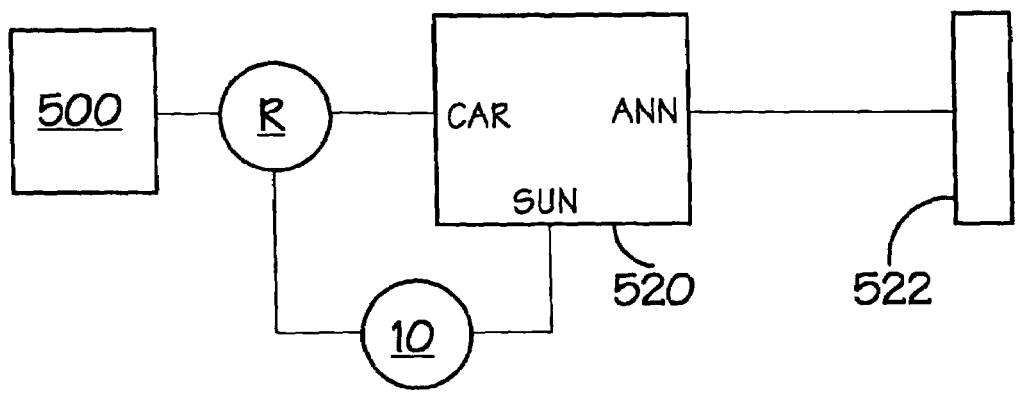
FIG. 1 is a highly simplified diagram of a continuously variable ratio transmission providing geared neutral and operable in accordance with the present invention.

FIG. 1 illustrates, a transmission providing geared neutral. The engine is indicated at 500 and drives the variator 10 which in turn drives the sun gear of epicyclic shunt 520. Also the engine drives the planet carrier CAR of the shunt 520 through a fixed ratio gear train R. Annular gear ANN of the shunt drives the vehicle wheels 522. As explained above, geared neutral is achieved at a certain variator ratio ("geared neutral ratio") at which the speeds of the sun gear and planet carrier cancel each other out, leaving the annular output gear stationary.

FIG. 1 is greatly simplified. A practical transmission has further gear trains between component parts of the transmission and also has clutches for engaging high and low regimes to expand the available range of ratios. These aspects are well known in the art. The principles relevant to a conventional vehicle launch (in low regime) can be understood from the drawings. Prior to launch, with the vehicle wheels stationary, the variator is at the geared neutral ratio. Torque at the driven wheels is proportional to the variator's control input—the pressure difference between lines 34 and 36—and so can be directly controlled. In a stationary, idle condition a low level of torque is applied to the wheels to provide creep. When the driver releases the brake and applies the accelerator to move away, the variator control signal is increased to raise wheel torque and the engine torque demand is raised, providing the necessary engine power. As discussed above, there is a delay in providing this engine power, which the present invention is intended to alleviate.

Figure 3:
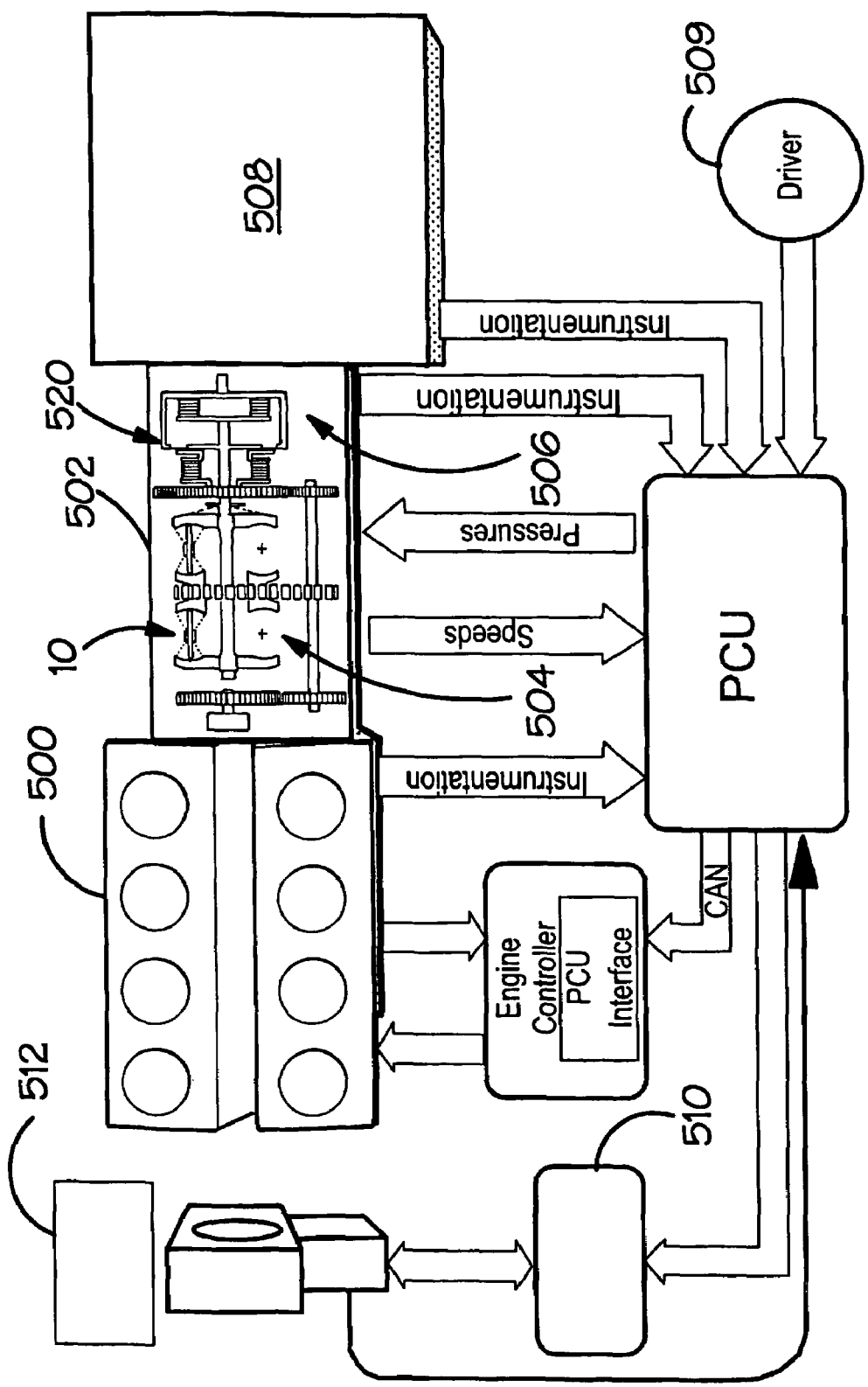
FIG. 3 is a diagram of a system for controlling the transmission.

The present invention can be implemented using any suitable control architecture but an example is provided in FIG. 3 wherein the engine is again seen at 500 and drives a continuously variable, torque-controlled type transmission 502. The diagram schematically indicates the variator 10 and the epicyclic shunt 520. Box 508 represents the vehicle including the driven wheels.

The control of both engine and transmission is performed electronically, subject to direction from the driver. Conventional digital microprocessors are programmed for this task in current embodiments. The illustrated architecture comprises an electronic Power Train Control Unit ("PCU") which receives data from instrumentation associated with the engine, the transmission and also from the driver's control 509 (formed e.g. by the accelerator and brake pedals of a conventional motor vehicle). In response the PCU provides outputs controlling the behaviour of both engine and transmission. Engine control is carried out through an electronic engine torque controller 510 and throttle 512.

Figure 4B:
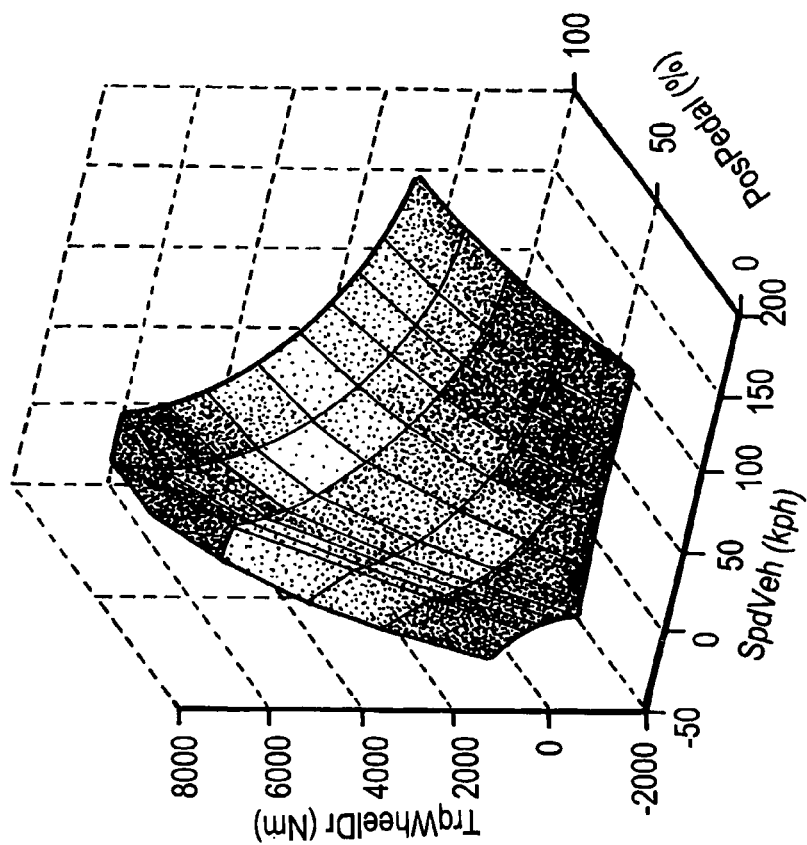
FIGS. 4a and 4b are three dimensional graphs illustrating default strategies for controlling (a) engine speed and (b) torque at the driven vehicle wheels respectively.

The PCU establishes base demands for engine speed and for torque at the driven vehicle wheels dependent upon the prevailing vehicle speed and pedal position. The engine and transmission are controlled upon the basis of the base demands. The variation of wheel torque demand (Trq wheel Dr) is represented in FIG. 4b and variation of engine speed demand (Spd Eng Dr) in FIG. 4a, vehicle speed being represented on the axis labelled SpdVeh and pedal position on the axis labelled PosPedal. It can be seen that in this scheme, at low vehicle speed, a large wheel torque can be set by the driver although the available range of engine speeds is low. The strategy is however modified, in accordance with the invention, when the driver requests an enhanced launch.

To explain now how the present invention enhances vehicle launch, consider first of all certain differences between a conventional transmission (with a torque converter) and the geared neutral type of transmission. If the driver practices left foot braking, the vehicle wheels are kept stationary and so (since rotary power is equal to torque times rotational speed) no power is output to the wheels. However the engine can be run by the driver at high speed and, in the case of a conventional transmission, the torque converter applies significant torque loading to the engine, so that power input to the transmission is high.

This power can only be dissipated by the transmission and this is principally through losses in the torque converter. Also it is because of the action of the torque converter, which can sustain a high torque at its input (engine-side) despite being stationary at its output (driven wheel) side that the torque loading can be applied to the engine.

The transmission considered herein, by contrast, has no torque converter or clutch in which heat can be dissipated. Power input to the transmission must be limited while the vehicle wheels are stationary, to a level which can be dissipated or absorbed by the transmission. Its ability to load the engine while the vehicle wheels are static is also more limited than the conventional automatic transmission. Note that if frictional effects are neglected then, because of the infinitely low gear ratio, the load on the engine is zero regardless of reaction torque—i.e. whatever wheel torque the transmission creates, no load is applied to the engine. In reality of course there is frictional resistance in the transmission which creates an engine load.

For these reasons, known control software for the transmission considered herein has to date been designed to detect attempts by the driver to carry out left foot braking and to prevent or limit increases in engine speed and engine output torque in this situation—i.e. to prevent this practice. The present inventor has however recognised that an enhanced launch can be carried out using this type of transmission, and indeed that important advantages are available.

In the present embodiment of the invention, the PCU is arranged to detect a driver demand for enhanced launch. The driver's indication of this demand may be through the pedals, concurrent depression of both brake and accelerator pedals while stationary being interpreted as a demand for enhanced launch. Some other control, ie a hand operated control, may however be used by the driver to indicate the demand. What the PCU does in response is to use a modified strategy for selecting the base engine speed and wheel torque requirements. Engine speed is permitted to rise above idle speed in response to accelerator pedal position. In setting wheel torque advantage can be taken of the fact that the transmission's output torque can be arbitrarily set, since wheel torque is proportional to reaction torque created by the variator. The modified base wheel torque strategy provides a wheel torque which is reduced, as compared with the usual strategy, so that it is not necessary while stationary for very large wheel torque to be reacted against the vehicle brakes.

Figure 4A:
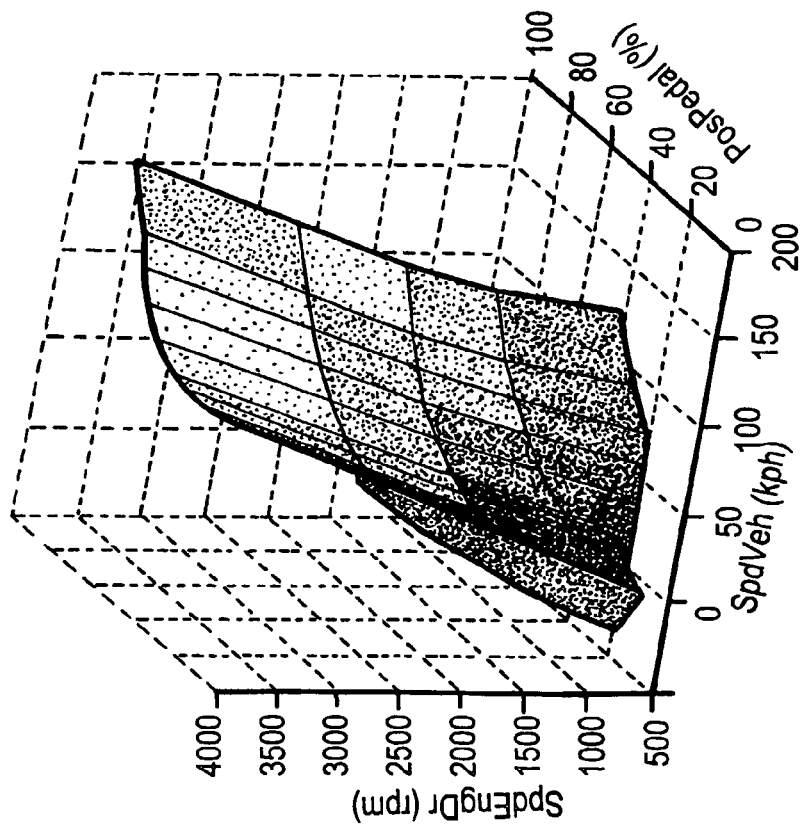
Figure 5A:
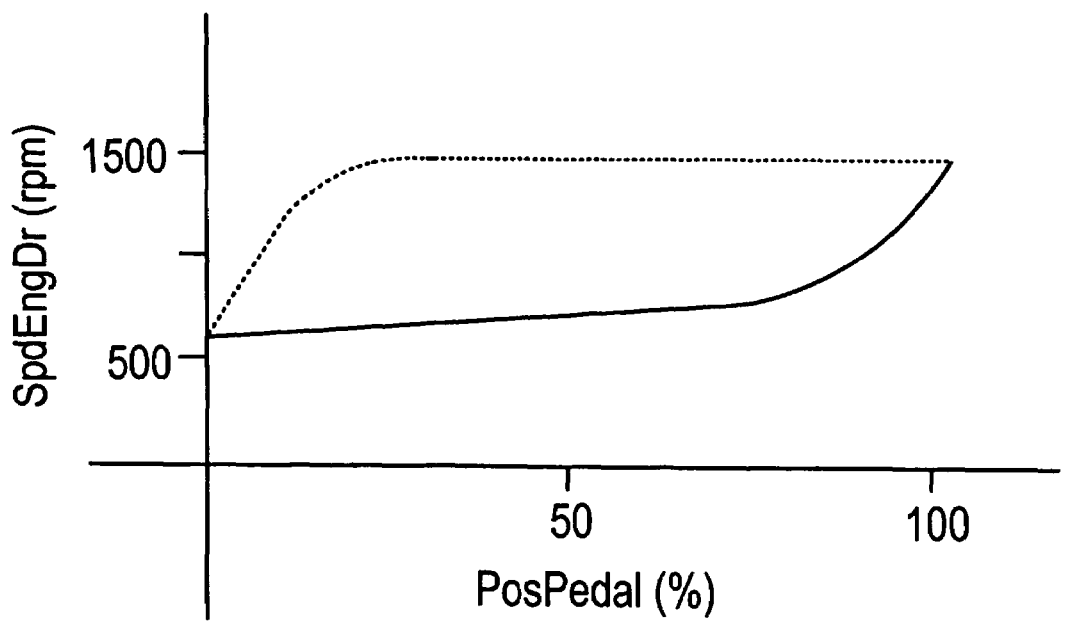
FIGS. 5a and 5b are two dimensional graphs illustrating modified strategies for controlling engine speed and engine torque respectively, while the vehicle is stationary.

In FIG. 5a pedal position is represented on the horizontal axis PosPedal and base engine speed demand on the vertical axis SpEngDr. This is a two dimensional graph representing the strategies available at zero vehicle speed—i.e. prior to launch. The default strategy for setting the base engine speed demand is shown as a solid line. This is the same relationship between pedal position and speed demand which is represented in FIG. 4a in the plane corresponding to zero vehicle speed.

The modified strategy is represented by a dotted line.

Figure 5B:
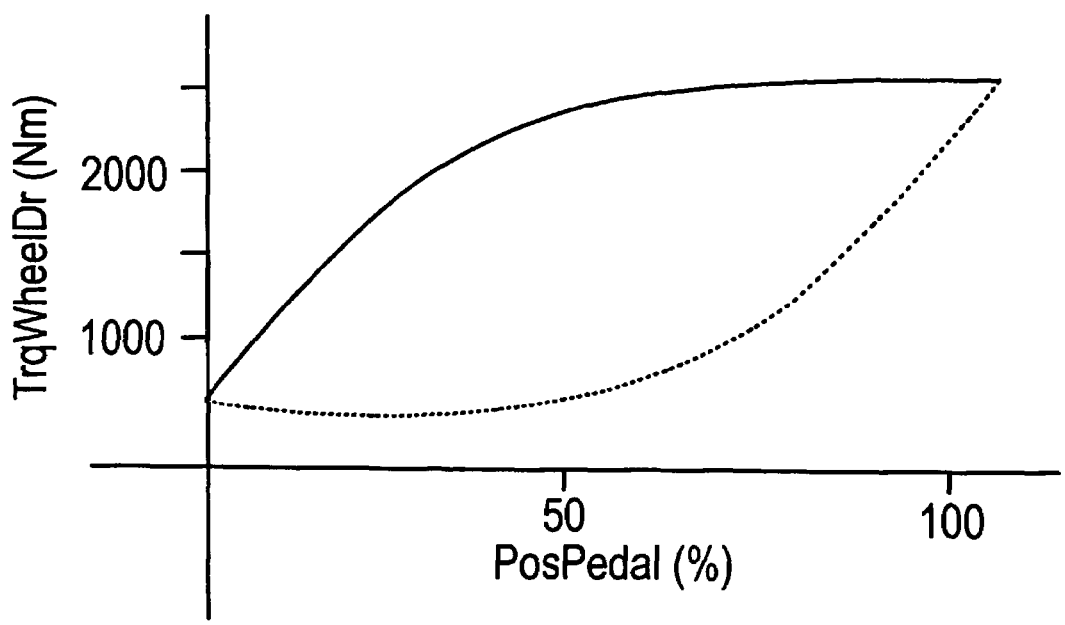

Similarly in FIG. 5b pedal position is on the horizontal axis PosPedal while the vertical axis TrqWheelDr here represents base wheel torque demand. The solid line represents the default wheel torque strategy and matches FIG. 4b, for zero vehicle speed. The dotted line represents the modified base wheel torque demand strategy.

It will be apparent that, for most pedal positions, the torque applied to the driven wheels of the vehicle is reduced in the modified strategy and the engine speed is increased as compared with the default strategy. Consequently the driver can prepare the vehicle for a rapid launch, by raising engine speed while the vehicle is stationary, without creating excessive wheel torques which would tend to cause the vehicle to move off prematurely and have to be restricted by a large brake force. Depression of the accelerator pedal to a mid point serves to raise engine speed to close to its maximum prelaunch level without excessive wheel torque. Note however that the driver can still create a higher wheel torque (100 percent of that available under the default strategy) by depressing the accelerator further, a facility which could for example prove important in moving off on an incline when the vehicle is heavily laden.

When the driver initiates launch (e.g. by releasing the brake pedal) the controller can then return to the default strategy. In the present embodiment this is done immediately following launch. Wheel torque demand thus typically rises rapidly. The engine, having been run at an elevated speed prior to launch, need not suffer from the lags involved in intake manifold pressurisation and engine acceleration. Upon launch the variator reaction pressure can be adjusted very rapidly, following the raised wheel torque demand, to provide the wheel torque required for rapid vehicle acceleration. Launch metrics, particularly acceleration in the initial launch stage, can be significantly improved.

An alternative is to provide a more gradual transition from the modified strategy to the default strategy, providing potentially a smoother launch.

The invention claimed is:

1. A controller for a motor vehicle drive train comprising an engine and a continuously variable ratio transmission providing geared neutral, the controller serving to set demands for wheel torque and engine speed in dependence upon a driver input, characterised in that the controller is adapted to respond to input from the driver indicative of a requirement for an enhanced launch by raising engine speed while implementing a reduced wheel torque strategy, and to subsequently raise wheel torque following input from the vehicle driver by which launch is initiated.

2. A controller as claimed in claim 1 wherein the driver input indicative of a requirement for engine speed increase prior to vehicle launch comprises concurrent application of the driver's brake and accelerator controls.

3. A controller as claimed in claim 2, wherein the driver input by which launch is initiated comprises release of the brake control.

4. A controller as claimed in claim 1, which is adapted to limit power input to the transmission prior to vehicle launch.

5. A controller as claimed in claim 1 which is for use with a transmission of torque controlled type, the controller being such as to provide a signal to the transmission proportional to the wheel torque to be provided.

6. A motor vehicle drive train comprising a controller as claimed in claim 1.

7. A method of controlling a motor vehicle drive train comprising an engine and a continuously variable transmission providing geared neutral, the method comprising setting demands for engine speed and wheel torque in dependence upon a driver input and being characterised in that, in response to a driver input indicative of a requirement for an engine speed increase prior to vehicle launch engine speed is raised while a reduced wheel torque strategy is implemented, wheel torque being subsequently raised following initiation of vehicle launch.

8. A method as claimed in claim 7 wherein the driver input indicative of a requirement for engine speed increase prior to vehicle launch comprises concurrent application of brake and accelerator controls.

9. A method as claimed in claim 7 wherein the transmission is of torque controlled type, comprising providing the transmission with a control input proportional to wheel torque.

* * * * *